May 23, 1933.    C. D. YOUNG    1,910,273
METHOD OF MAKING JOURNAL BOXES
Original Filed Jan. 27, 1931    2 Sheets-Sheet 1
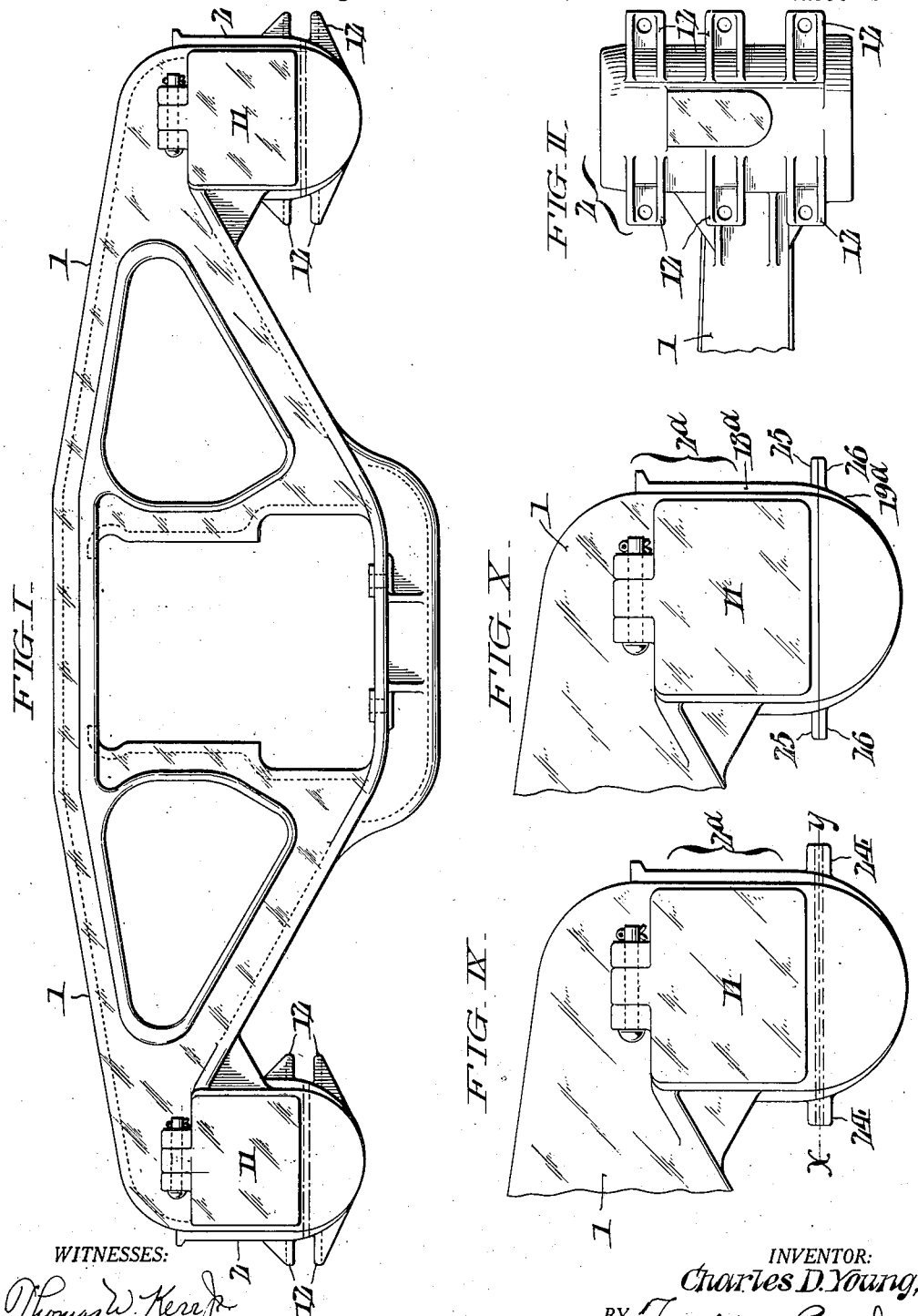
INVENTOR:
Charles D. Young,
BY
ATTORNEYS.

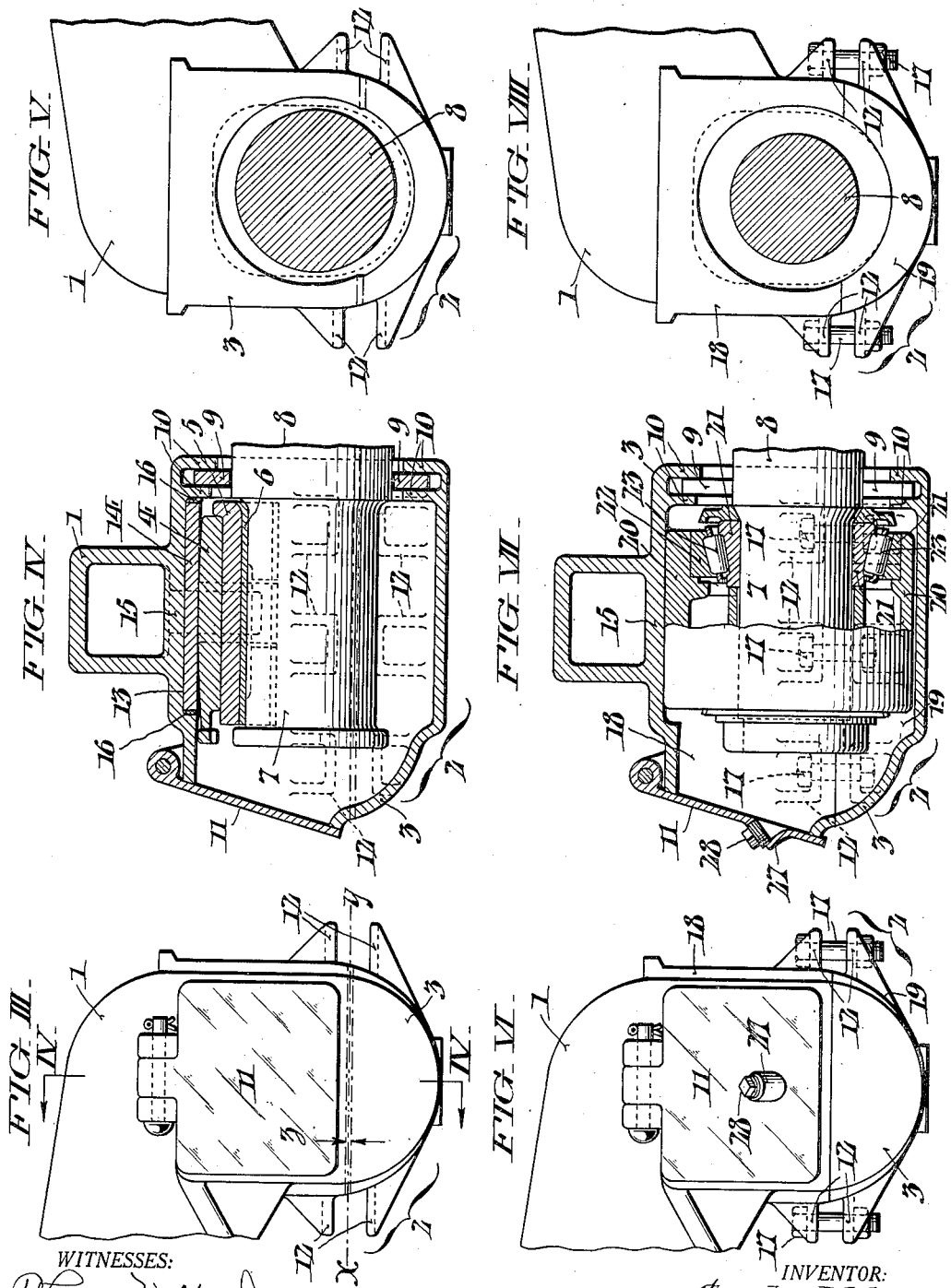

Patented May 23, 1933

1,910,273

UNITED STATES PATENT OFFICE

CHARLES D. YOUNG, OF HAVERFORD, PENNSYLVANIA

METHOD OF MAKING JOURNAL BOXES

Original application filed January 27, 1931, Serial No. 511,525. Divided and this application filed October 22, 1931. Serial No. 570,313.

This invention relates to a method of making journal boxes so that they may be readily converted from use with one type of axle bearing to use with another type of axle bearing. This application constitutes a division of my pending application, Serial No. 511,525, filed January 27, 1931.

Trucks for railway vehicles, such as freight cars, are commonly made with the journal boxes cast integrally with the side frames, and surfaced interiorly to accommodate a bearing fitted with a car journal brass lined with soft metal made up of separate sections, a construction which permits the journal boxes to be made in one piece. A large proportion of the freight cars now in use have trucks of this character. It is believed, however, that before many years pass, roller bearings will be generally adopted for freight cars, and that there will be a gradual conversion of rolling stock of railroads from the common form of truck journal boxes with journal brasses to journal boxes adapted for antifriction bearings. The superior advantages of anti-friction bearings have already been demonstrated, but the conversion of freight car trucks to anti-friction bearings is a matter which obviously involves great expense to a railroad and which can only be accomplished over a long period of years. Anti-friction bearings necessitate the use of split journal boxes with securing means applied for holding the separate sections together. In order to obviate the necessity, upon the conversion of a car truck to anti-friction bearings, of replacing the complete side frames of the trucks in cases where the journal boxes are cast integrally with the side frames, or of replacing the journal boxes in cases where they are made separate from the side frames, I have invented a form of journal box which can be readily changed from use with a journal brass to use with anti-friction bearings.

It is contemplated that railroads will desire to continue for some time the manufacture of freight car truck frames and journal boxes of the types now in common use, but that a time will come when it will be determined to make the conversion to anti-friction bearings. The object of my invention is to provide for this contingency so that when such a decision is made the operations required to effect the conversion shall be of a simple nature involving comparatively little expense.

Other objects and advantages specifically characterizing this invention will become more apparent from the description of one embodiment of the invention and some of the contemplated modifications thereof which follows, having reference to the accompanying drawings, whereof:

Fig. I is a side elevation of a truck frame with integral journal boxes made according to the practice of this invention.

Fig. II is a bottom view of an end portion of said frame and the journal box at that end.

Fig. III is an enlarged side elevation of the journal box and end portion of the frame of Fig. I.

Fig. IV is a cross section of the same, taken as indicated by the line IV—IV of Fig. III.

Fig. V is an opposite side elevation of the same.

Fig. VI is a view similar to Fig. III, but showing the journal box after conversion from a stationary bearing to an anti-friction bearing.

Fig. VII is a view similar to Fig. IV, but showing the journal box after conversion from a stationary bearing to an anti-friction bearing.

Fig. VIII is a view similar to Fig. V, but showing the journal box after conversion from a stationary bearing to an anti-friction bearing.

Fig. IX is a side elevation of a modified form of journal box; and,

Fig. X is a similar view showing the exterior of the journal box after it has been split horizontally to accommodate an anti-friction bearing.

In the drawings, there is shown in Fig. I a standard form of side frame at 1 having at the ends threof journal boxes 2 cast integrally with the frame 1. The journal boxes are, generally speaking of the customary form used on freight cars and need therefore be only briefly described. As shown in Fig. IV, such a box comprises a one piece casing 3 having at the top thereof a journal bearing wedge 4 which engages a journal bearing 5 with a soft metal lining 6 supported by the journal 7 of the axle 8. At the point where the axle enters the casing 3 a dustguard 9 is provided, the casing being formed with annular flanges 10 which serve as a housing for the dustguard 9. The usual hinged cover for the front of the casing is shown at 11. As thus far described the construction corresponds to standard practice.

Upon the exterior surface of the journal box, I provide, for example, a number of projecting lugs or ears 12 which may be oppositely aligned in double rows and which are spaced symmetrically about a predetermined sectional plane $x$—$y$ running horizontally through the journal box. These lugs 12 are of a form designed to accommodate means for securing the upper and lower sections of the box together when it is later split incident to its conversion for use with anti-friction bearings. At the top of the journal box, as shown in Fig. IV, the casing 3 is formed with a recessed area 13 within which is fitted a filler piece 14. The combined thickness of the top portion 15 and filler piece 14 represents the usual thickness of the casing at this point in journal boxes now commonly used. The filler piece 14 is preferably joined to the casing by welding as at 16, but the joint is intended to be a temporary one and should therefore be so made as to permit the filler piece to be readily removed by cutting along the welded areas and at the same time the joint should be sufficiently strong to prevent displacement of the filler piece incident to long service.

To effect conversion of the journal box from use with a bearing such as shown in Fig. IV to use with an anti-friction bearing, the casing 3 is cut along a predetermined plane such as $x$—$y$ and the severed sections 18 and 19 are assembled as shown in Figs. VI, VII and VIII. In this assembly the oppositely aligned ears 12 are secured together by bolts 17. The ears 12 may obviously be cored when the journal box is first made or drilled when the conversion is made to use with anti-friction bearings. Furthermore, the specific means employed for securing together the severed sections 18 and 19 of the journal box may take many forms and are not considered material to this invention, which contemplates a variety of methods for fastening or hinging the upper and lower sections 18 and 19 of the journal box. As shown in Fig. VII, when the conversion to the use of roller bearings is performed, the filler piece 14 at the top of the casing is cut out in order that an anti-friction bearing of substantially similar, or if desired somewhat larger, dimensions may be inserted within the journal box. It will be observed that in cutting the journal box along the plane $x$—$y$, a certain amount of the metal of the box will be removed, (which may, of course, be provided for in the original design), the thickness of this metal being indicated at $z$. The removal of the filler piece 14 compensates for the change in the vertical dimension of the journal box.

The journal bearing shown in Fig. VII is of a common form and comprises generally an outer annulus 20, which bears upon the top and bottom of the casing 3, and cone shaped races 21 and 22 with rollers 23, the races 21, 22 being disposed between the annular casing 20 and the journal 7 of the axle 8. The inner race 21 bears upon the journal 7 and the outer race 22 bears upon the casing 20.

To provide for the lubrication of the bearings, the lid 11 of the journal box is formed with an opening 27 in which a plug 28 may be inserted. The lid 11 may be sealed and the oil admitted to the cellar of the box through the opening 27.

In Figs. IX and X there is shown a modified form of journal box 2a in which, instead of employing oppositely aligned projections, there is provided a flange 24 at a predetermined sectional plane $x$—$y$. When the casing is cut along the line $x$—$y$, the journal box constituted two flanged sections 18a and 19a, the cut being made through the center of the flange. The opposite flanges shown in Fig. X at 25 and 26 may be secured together in any desired manner.

It will be apparent that in lieu of the particular forms of projecting means shown at the sides of the journal box, other forms may be used, and my invention contemplates a variety of forms for the surface configuration of the box by which the securing together of its upper and lower sections may be facilitated when the box is severed.

It will be apparent from the above description that the herein described method of making journal boxes according to the practice of my invention involves a very simple alteration of the standard forms of journal boxes now in use, and yet enables the conversion of the box from one type of bearing to another type of bearing to be easily performed. Where journal boxes form integral parts of truck side frames, this obviates the necessity of replacing the side frames, and results in a very considerable saving.

While I have described my invention in some detail, and with reference to specific examples of the practice thereof, it will be apparent that changes may be made in the particular steps of making and converting a journal box as herein described without departing from the spirit of the invention as defined in the annexed claims.

Having thus described my invention, I claim:—

1. The method of making a journal box for the accommodation of one type of bearing and converting the same to accommodate another type of bearing which consists in originally making the journal box with aligned projections thereon spaced with respect to a predetermined sectional plane through the box, and thereafter severing said box at said sectional plane and inserting means at said projections for securing the severed sections together.

2. The method of making a journal box for the accommodation of one type of bearing and converting the same to accommodate another type of bearing which consists in originally making the journal box with a flange thereon, and thereafter severing said box at said flange to form separate flanged sections, and inserting means at said flanges for securing said sections together.

3. The method of making a journal box for the accommodation of one type of bearing and converting the same to accommodate another type of bearing which consists in originally making the journal box with projecting means thereon spaced with respect to a predetermined sectional plane through said box, providing a temporary filler piece within said box, thereafter severing said box at said sectional plane, and securing the severed sections together at said projecting means.

In testimony whereof, I have hereunto signed my name at Philadelphia, Pennsylvania, this 20th day of October, 1931.

CHARLES D. YOUNG.